(12) United States Patent
Gander et al.

(10) Patent No.: US 7,073,649 B2
(45) Date of Patent: Jul. 11, 2006

(54) FRICTION CLUTCH ACTUATION LEVER

(75) Inventors: Gerhard Gander, Bühlertal (DE); Patrick Weydmann, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 34 days.

(21) Appl. No.: 10/901,908

(22) Filed: Jul. 29, 2004

(65) Prior Publication Data

US 2005/0061603 A1    Mar. 24, 2005

(30) Foreign Application Priority Data

Aug. 1, 2003   (DE) ................................. 103 35 412

(51) Int. Cl.
*F16D 13/58* (2006.01)
(52) U.S. Cl. .................................................. 192/99 A
(58) Field of Classification Search ............... 192/99 A
See application file for complete search history.

(56) References Cited

U.S. PATENT DOCUMENTS

| | | | | | |
|---|---|---|---|---|---|
| 3,215,233 | A | * | 11/1965 | Smith et al. ............... | 192/48.7 |
| 4,238,019 | A | * | 12/1980 | Maucher et al. .......... | 192/99 A |
| 4,256,210 | A | * | 3/1981 | Dubiel et al. ............. | 192/99 A |
| 4,298,112 | A | * | 11/1981 | Carstensen ............... | 192/70.29 |
| 5,678,669 | A | * | 10/1997 | Rainer ....................... | 192/48.8 |

\* cited by examiner

*Primary Examiner*—Saul Rodriguez
(74) *Attorney, Agent, or Firm*—Alfred J. Mangels

(57) ABSTRACT

A friction clutch, especially a double clutch, with a clutch housing on which at least one actuation lever is pivotally supported. A connecting member in the form of a pressure lever or an eyebolt is coupled with the actuation lever for actuation of a clutch pressure plate. The pressure lever or the eyebolt is formed as a one-piece stamped element to minimize machining and assembly costs.

19 Claims, 4 Drawing Sheets

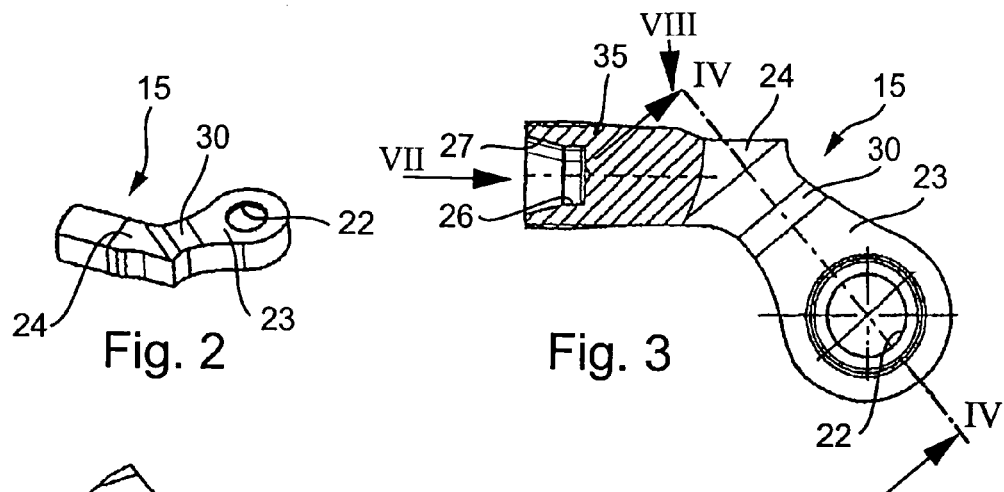
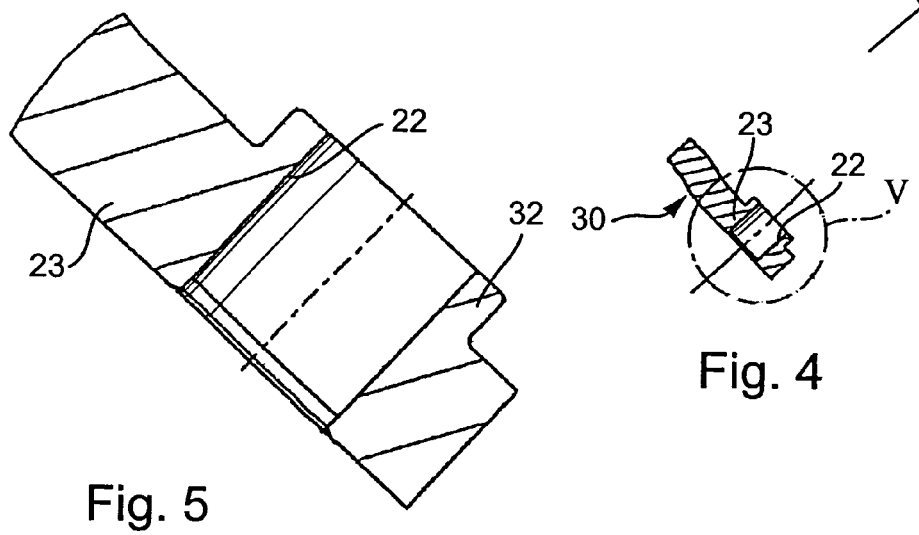
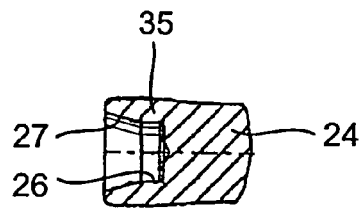
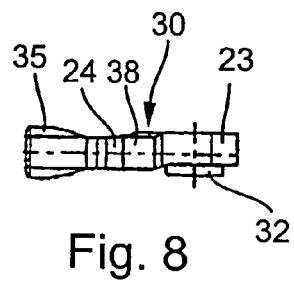
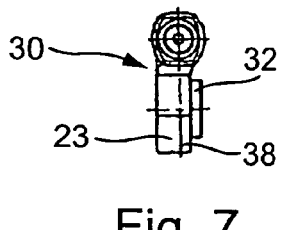

FRICTION CLUTCH ACTUATION LEVER

BACKGROUND OF THE INVENTION

1. Field of the Invention

The invention relates to a friction clutch, especially a double clutch, with a clutch housing on which is pivotally supported at least one lever that is coupled with a pressure lever for operation of a pressure plate.

2. Description of the Related Art

Conventional friction clutches are often equipped with forged pressure levers that must be machined in a costly operation. In addition, pressure levers are also utilized that are composed of several stamped elements, the assembly of which leads to increased manufacturing costs.

An object of the invention is therefore to produce a friction clutch, especially a double clutch, with a clutch housing on which at least one lever is pivotally supported and is coupled with a pressure lever to operate a pressure plate, wherein the pressure lever can be simply formed and economically manufactured.

SUMMARY OF THE INVENTION

The object is achieved with a friction clutch, especially a double clutch, having a clutch housing on which at least one lever is pivotally supported that is coupled with a pressure lever for actuation of a pressure plate. The pressure lever is formed as a single-piece, stamped element with a blind bore formed at one end and a throughbore at the other end, wherein the longitudinal axis of the throughbore is arranged substantially perpendicular to the longitudinal axis of the blind bore. In that way, subsequent machining, as it is necessary with forged parts, can be eliminated.

The stamped pressure lever is preferably formed by a descending tool so that following the forming process, and due to its own weight, the lever drops out of the tool of the press that is utilized for stamping.

A preferred embodiment of the friction clutch is characterized in that the blind bore is formed so that the material surrounding the blind bore is compressed. By the compression of the material surrounding the blind bore, sufficient strength is achieved without an expensive heat treatment of the pressure lever.

A further preferred embodiment of the friction clutch is characterized in that a thickened area is formed on the pressure lever in the region of the blind bore. By virtue of the thickened area the pressure lever is reinforced in the region of the blind bore.

A further preferred embodiment of the friction clutch is characterized in that a collar is formed on the pressure lever on one side in the region of the throughbore. By virtue of the formed collar the length of the throughbore is enlarged. In that way, improved support is achieved in the installed condition of the pressure lever.

A further preferred embodiment of the friction clutch is characterized in that the pressure lever has an offset between the blind bore and the throughbore. By means of the offset the two ends of the pressure lever have longitudinal axes that lie in a common plane, although the ends are formed differently. The longitudinal axis of the pressure lever at the end with the throughbore that is lengthened by the collar intersects the longitudinal axis at the end of the pressure lever that is thickened in the region of the blind bore.

The invention also relates to a friction clutch, especially a double clutch, with a clutch housing on which at least one lever is pivotally supported and which cooperates with an eyebolt for actuation of a pressure plate.

Conventional friction clutches are often equipped with multiple eyebolts, the individual parts of which must be expensively machined and assembled.

Another object of the invention is to produce a friction clutch, especially a double clutch, with a clutch housing on which is pivotally supported at least one lever that cooperates with an eyebolt for operation of a pressure plate, that has a simple design, and that can be manufactured inexpensively.

The object is achieved with a friction clutch, especially a double clutch, with a clutch housing on which at least one lever formed as a single-piece stamped element is pivotally supported, which cooperates with an eyebolt for operation of a pressure plate. The eyebolt is arranged with a thread formed at one end and a throughbore formed at the other end, the longitudinal axis of which is arranged substantially perpendicular to the longitudinal axis of the thread. That results in the advantage that expensive machining and assembly of individual parts can be eliminated. The stamped eyebolt is preferably formed by a descending tool so that the part falls by itself out of the tool of the press that is utilized for stamping.

A preferred embodiment of the friction clutch is characterized in that a collar is formed on the eyebolt on one side in the region of the throughbore. The length of the throughbore is thus enlarged by the formed collar. In that way, improved support is attained in the installed condition of the eyebolt.

A further preferred embodiment of the friction clutch is characterized in that the eyebolt has an offset between the thread and the throughbore. By means of the offset, the two ends of the eyebolt have longitudinal axes that lie in a common plane, although the ends are formed differently. The axis at the end of the eyebolt with the throughbore that is lengthened by the collar intersects the axis at the end of the eyebolt that is equipped with the thread.

A further preferred embodiment of the friction clutch is characterized in that a peripheral shoulder is formed on the eyebolt between the thread and the throughbore. The shoulder forms a stop for a spring in the installed condition of the eyebolt.

A further preferred embodiment of the friction clutch is characterized in that the thread is embossed on only on two opposed sides on one end of the eyebolt. The thread, which is not completely but rather only partially formed, suffices for fastening a nut securely on the end of the eyebolt.

BRIEF DESCRIPTION OF THE DRAWINGS

Further advantages, features, and details of the invention will be apparent from the following description, in which various embodiments are described in detail with reference to the drawings. Thereby the features mentioned in the claims and the description, respectively, can be essential for the invention either individually or in any desired combination. In the drawings:

FIG. 2 is a perspective view of the pressure lever shown in FIG. 1;

FIG. 3 is a side elevational view of the pressure lever shown in FIG. 2;

FIG. 4 is a cross-sectional view taken along the line IV—IV of FIG. 3;

FIG. 5 is an enlarged cross-sectional view of portion V of FIG. 4;

FIG. 6 is a fragmentary cross-sectional view of the end with the blind bore as in FIG. 3;

FIG. 7 is a view taken in the direction of arrow VII of FIG. 3;

FIG. 8 is a view taken in the direction of arrow VIII of FIG. 3;

DESCRIPTION OF THE PREFERRED EMBODIMENTS

Figure 1:
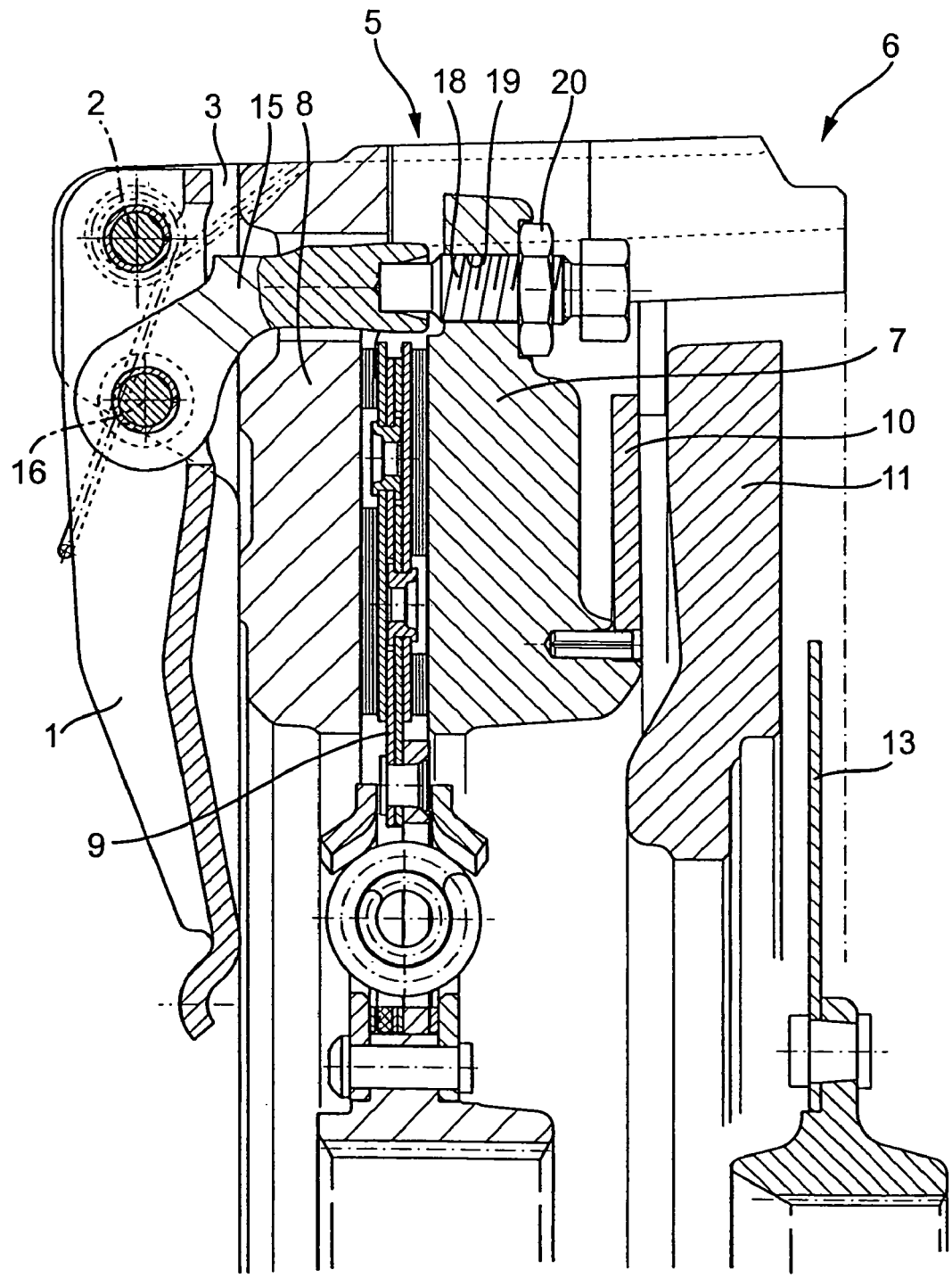
FIG. 1 is a cross-sectional view of a friction clutch with a pressure lever in accordance with the invention.

A double clutch is shown in a sectional view in FIG. 1, the actuation system of which includes an actuation lever 1 that is pivotally supported on a housing 3 with the aid of a pin 2. The double clutch includes a first clutch 5 and a second clutch 6. The first clutch 5 includes a pressure plate 7 and a counterpressure plate 8, between which a first clutch disk 9 with friction linings can be clamped. The pressure plate 7 is acted upon by a disk spring 10, the other side of which rests against a pressure plate 11 of the second clutch 6. A second clutch disk 13 can be clamped between the pressure plate 11 and an associated counterpressure plate (not shown).

A pressure lever 15 is pivotally supported on the actuation lever 1 with the aid of a pin 16. The free end of the pressure lever 15 interacts cooperatively with a stop screw 18 that is screwed into a tapped hole 19 that is provided radially outwardly in the pressure plate 7. The stop screw 18 is set in position in tapped hole 19 with the aid of a jam nut 20.

It can be seen in FIGS. 2 and 3 that a throughbore 22 for guiding the pin is hollowed out at one end of the pressure lever 15. The throughbore 22 is formed in the region of an eye 23, from which an arm 24 extends at an angle. The angle between the longitudinal axis of the arm 24 and that of the eye 23 amounts to approximately 130 to 140 degrees. At the end of the free end of the arm 24 a blind bore 26 is formed including an inclination 27. The longitudinal axis of the blind bore 26 is coincident with the longitudinal axis of the arm 24. The longitudinal axis of the throughbore 22 is perpendicular to the longitudinal axis of the eye 23. In addition, the longitudinal axis of the blind bore 26 is also arranged perpendicular to the longitudinal axis of throughbore 22.

One can particularly see in FIG. 4 that an offset 30 is formed between the blind bore 26 and the throughbore 22 at an end of the eye 23. In that context "offset" means that the pressure lever 15 does not extend in a single plane, but first extends in a first plane, then runs obliquely, and then extends in a second plane that is arranged parallel to the first plane.

In FIG. 5 it can be seen that a collar 32 is formed in the region of the throughbore 22 on the eye 23, the collar extending outwardly from one side of the eye 23. The length of the throughbore 22 is enlarged in the axial direction by the collar 32.

One can see in FIGS. 3 and 6 that the pressure lever has a thickened area 35 at its free end in the region of the blind bore 26 and the inclination 27. The thickened area 35 is attributable to the shaping process for producing the blind bore.

One can see in FIGS. 7 and 8 that the longitudinal axes of the arm 24 and the eye 23 with the collar 32 lie in a single plane 38. That is achieved by the offset 30.

Figure 9:
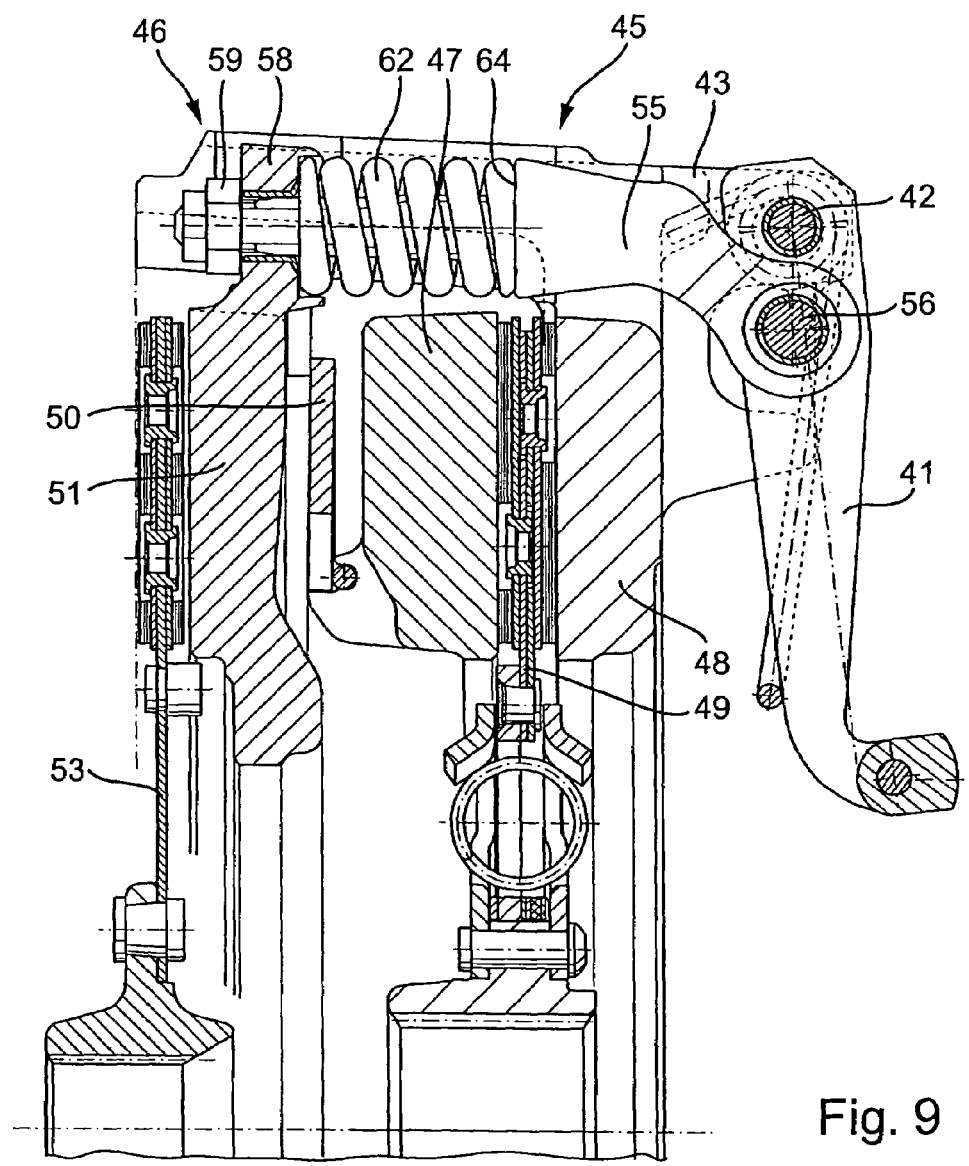
FIG. 9 is a cross-sectional view of a friction clutch with an eyebolt in accordance with the invention.

A double clutch is shown in a sectional view in FIG. 9, the actuation system of which includes an actuation lever 41 that is pivotally supported on a housing 43 with the aid of a pin 42. The double clutch includes a first clutch 45 and a second clutch 46. The first clutch 45 includes a pressure plate 47 and a counterpressure plate 48. Between the pressure plate 47, which is axially movable to a limited extent within the housing 43, and the counterpressure plate 48 is a clampable clutch disk 49 with friction linings. The pressure plate 47 is contacted by a disk spring 50, the other side of which lies against a pressure plate 51 of the second clutch 46. The pressure plate 51 cooperates with a counterpressure plate (not shown) to clampingly engage a clutch disk 53 having friction linings. One end of an eyebolt 55 is pivotally supported on the actuation lever 41 with the aid of a pin 56. The other end of the eyebolt 55 is fastened with the aid of a nut 59 on a projection 58 on the pressure plate 51. A compression coil spring 62 is clamped between the projection 58 of the pressure plate 51 and a shoulder 64 that is formed on the eyebolt 55.

Figure 10:
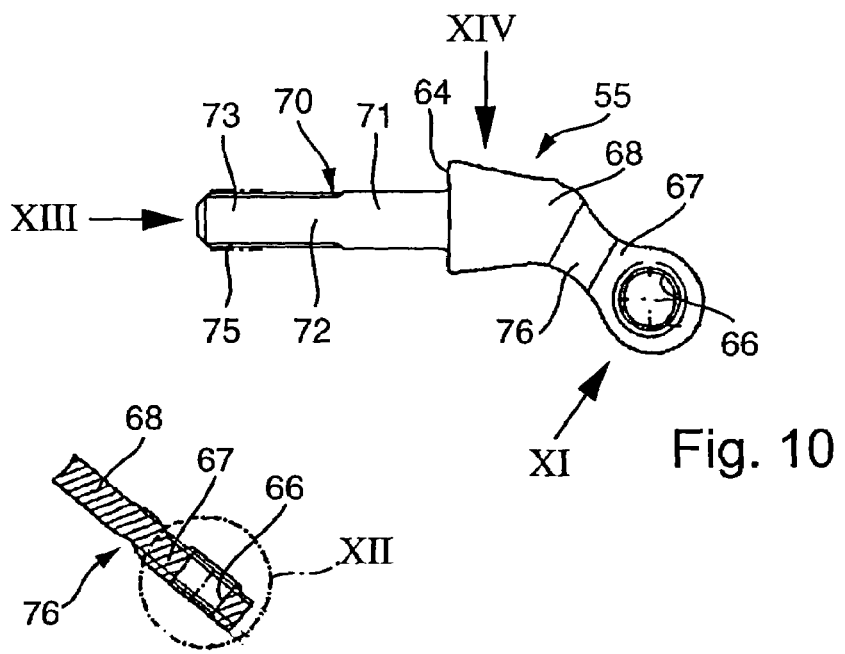
FIG. 10 is a side elevational view of the eyebolt of FIG. 9.

In FIG. 10 there is shown a throughbore 66 that is hollowed out on one end of the eyebolt 55 for the pin 56. The throughbore 66 is surrounded by an eye 67 that turns into a base 68. The base 68 is slightly angled in relation to the eye 67 and widens toward the shoulder 64. A stud 70 having three axial sections 71, 72, and 73 with different outer diameters extends from the base 68. The section 71 has the largest and section 73 has the smallest outer diameter. A thread 75 is formed on the outside of section 73.

Figures 11, 12, 13:
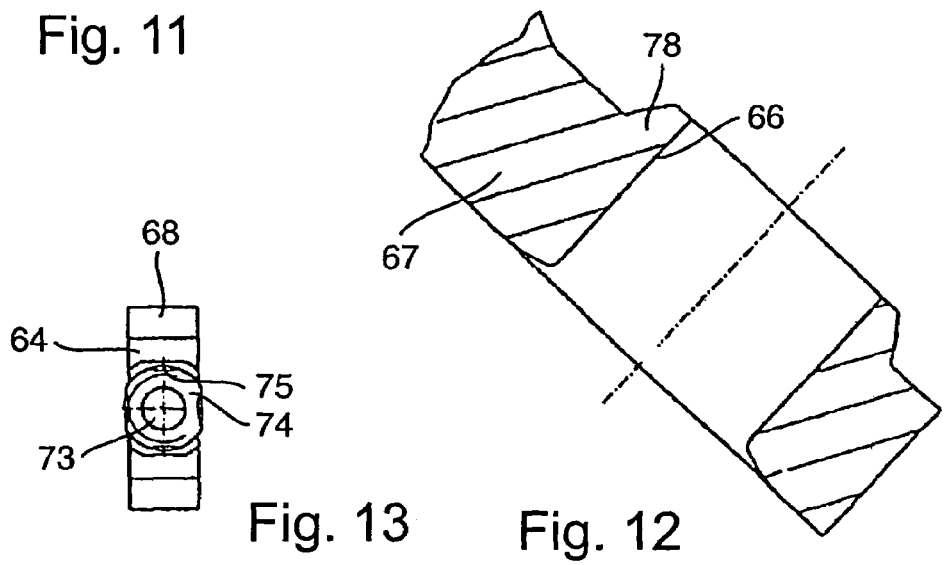
FIG. 11 is a view taken in the direction of arrow XI of FIG. 10.
FIG. 12 is an enlarged view of portion XII of FIG. 11.
FIG. 13 is a view taken in the direction of arrow XIII of FIG. 10.

In FIG. 11 one can see that an offset 76 is formed in the transition region between the eye 67 and the base 68. In that context "offset" means that the base 68 extends in a plane that is arranged parallel to and spaced from a plane in which the eye 67 extends. The eyebolt 55 has a curved form in the transition region at the offset 76.

In FIG. 12 one can see that a collar 78 is formed in the region of the throughbore 66 on one side of the eye 67. The length of the throughbore 66 is increased by the collar 78.

In FIG. 13 one can see that the thread 75 does not extend over the entire periphery of the axial section 73, but is merely stamped on two opposite sides. The two-sided stamping of the thread nonetheless suffices to ensure a secure fastening of the associated nut.

Figure 14:
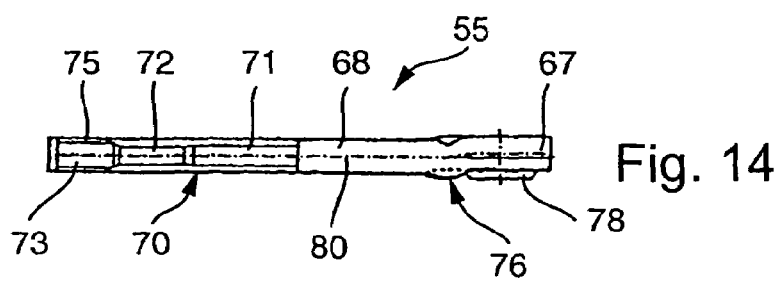
FIG. 14 is a view taken in the direction of arrow XIV of FIG. 10.

In FIG. 14 one can see that the formation of the collar 78 in the region of the throughbore is compensated by the offset 76, so that the eyebolt 55 has a common axis 80.

The double clutches shown in FIGS. 1 and 9 are provided with different reference numbers. It should be pointed out that the double clutches shown in FIGS. 1 and 9 can be one and the same clutch, which can be equipped with an eyebolt 55 as it is shown in FIGS. 10 through 14, as well as with a pressure lever 15 as it is shown in FIGS. 2 through 8.

Although particular embodiments of the present invention have been illustrated and described, it would be apparent to those skilled in the art that various changes and modifications can be made without departing from the spirit of the present invention. It is therefore intended to encompass within the appended claims all such changes and modifications that fall within the scope of the present invention.

What is claimed is:

1. A friction clutch comprising: a clutch housing; at least one lever pivotally supported by the clutch housing; a pressure lever coupled with the at least one lever for actuation of a pressure plate, wherein the pressure lever is a single-piece stamped member and includes a blind bore at one end and a throughbore at another end, wherein the throughbore has a longitudinal axis that is substantially perpendicular to a longitudinal axis of the blind bore, and wherein the pressure lever includes in the region of the throughbore a thickened region that increases the length of the throughbore, and includes a thickened region adjacent the blind bore.

2. A friction clutch in accordance with claim 1, wherein material surrounding the blind bore is in a compressed condition.

3. A friction clutch in accordance with claim 1, including a collar provided on one side of the pressure lever adjacent the throughbore.

4. A friction clutch in accordance with claim 3, wherein the collar is an integral annular formation that is coaxial with and is an extension of the throughbore.

5. A friction clutch in accordance with claim 1, wherein the pressure lever includes an offset region between the blind bore and the throughbore.

6. A friction clutch in accordance with claim 1, wherein the clutch is a double clutch.

7. A friction clutch in accordance with claim 1, wherein the thickened region surrounds the blind bore.

8. A friction clutch in accordance with claim 1, wherein the pressure lever is an angular structure and includes a first arm that carries the blind bore and a second arm angularly connected with the first arm and that carries the throughbore, wherein the first and second arms are connected with each other to define an obtuse included angle.

9. A friction clutch in accordance with claim 8, wherein the obtuse included angle is between about 130° and about 140°.

10. A friction clutch comprising: a clutch housing: at least one lever pivotally supported by the clutch housing; an eyebolt coupled with the at least one lever for actuation of a pressure plate, wherein the eyebolt is a single-piece stamped member and includes a thread at one end and a throughbore at another end, wherein the throughbore has a longitudinal axis that is substantially perpendicular to a longitudinal axis of the thread, and wherein the eyebolt includes in the region of the throughbore a thickened region that increases the length of the throughbore, and includes in the region of the thread a thinned region that is smaller than the outer diameter of the thread.

11. A friction clutch in accordance with claim 10, including a collar provided on one side of the eyebolt adjacent the throughbore.

12. A friction clutch in accordance with claim 11, wherein the collar is an integral annular formation that is coaxial with and is an extension of the throughbore.

13. A friction clutch in accordance with claim 10, wherein the eyebolt includes an offset region between the thread and the throughbore.

14. A friction clutch in accordance with claim 10, including a peripheral shoulder on the eyebolt between the thread and the throughbore.

15. A friction clutch in accordance with claim 10, wherein the thread is formed on only two diametrically opposite longitudinal sides adjacent the one end of the eyebolt.

16. A friction clutch in accordance with claim 15, wherein the thread is a stamped thread.

17. A friction clutch in accordance with claim 10, wherein the clutch is a double clutch.

18. A friction clutch in accordance with claim 10, wherein the eyebolt is an angular structure and includes a first arm that carries the thread and a second arm angularly connected with the first arm and that carries the throughbore, wherein the first and second arms are connected with each other to define an obtuse included angle.

19. A friction clutch in accordance with claim 18, wherein the obtuse included angle is between about 130° and about 140°.

* * * * *